United States Patent [19]
Kikuchi

[11] 3,801,926
[45] Apr. 2, 1974

[54] HIGH INTENSITY RADIATION SOURCE
[75] Inventor: Tom T. Kikuchi, Santa Barbara, Calif.
[73] Assignee: General Motors Corporation, Detroit, Mich.
[22] Filed: Aug. 31, 1972
[21] Appl. No.: 285,139

[52] U.S. Cl................. 331/94.5, 313/224, 313/223
[51] Int. Cl............................................... H01s 3/22
[58] Field of Search ............ 331/94.5; 313/224, 223

[56] References Cited
UNITED STATES PATENTS
3,521,191 7/1970 Golden et al...................... 331/94.5

OTHER PUBLICATIONS
Bennett, Jr. et al., "Physical Review Letters," Vol. 8, No. 12, June 15, 1962, pp. 470–473 QC 1 P44

Waksberg et al., "Applied Physics Letters," Vol. 6, No. 7 April 1, 1965, pp. 137–138 QC 1A745

Primary Examiner—Ronald L. Wibert
Assistant Examiner—R. J. Webster
Attorney, Agent, or Firm—Warren D. Hill

[57] ABSTRACT

An atomic oxygen laser produces, in addition to or in lieu of coherent light, a secondary ultra-violet radiation. A window in the side of the laser housing permits the radiation to escape so that the laser serves as an ultra-violet source. The radiation can be modulated by vibrating an end mirror of the laser. If coherent light from the laser is not desired, the end mirrors are made fully reflecting. Other types of lasers produce secondary radiation at various frequencies so that these other lasers may be modified for use as radiation sources as well.

4 Claims, 2 Drawing Figures

PATENTED APR 2 1974 3,801,926

HIGH INTENSITY RADIATION SOURCE

This invention relates to radiation sources and particularly to a source of non-coherent radiation comprising a modified laser cavity.

It is often desired to provide a source of radiation having a high intensity. In addition it is desirable to have a way of modulating the radiation from the source. While it has been known to use a laser to provide high intensity coherent radiation, the present invention utliizes a laser device to provide non-coherent high intensity radiation.

It is therefore a general object of the invention to provide a high intensity source of non-coherent radiation from a modified laser device.

It is another object of the invention to provide a source of modulated high intensity non-coherent radiation from a modified laser device.

It is still another object of the invention to provide a source of high intensity non-coherent ultra-violet radiation from a laser device in which the radiation may be modulated if so desired.

The invention is carried out by providing a lasing medium in an optical resonating cavity and a pumping device for exciting the medium to produce laser action. A window in the cavity allows the escape of secondary radiation which results from the lasing action. The invention further contemplates providing a way to modulate the lasing action in order to modulate the secondary radiation. This is accomplished, for example, by rapidly vibrating one of the mirrors of the optical resonator.

Figure 1:
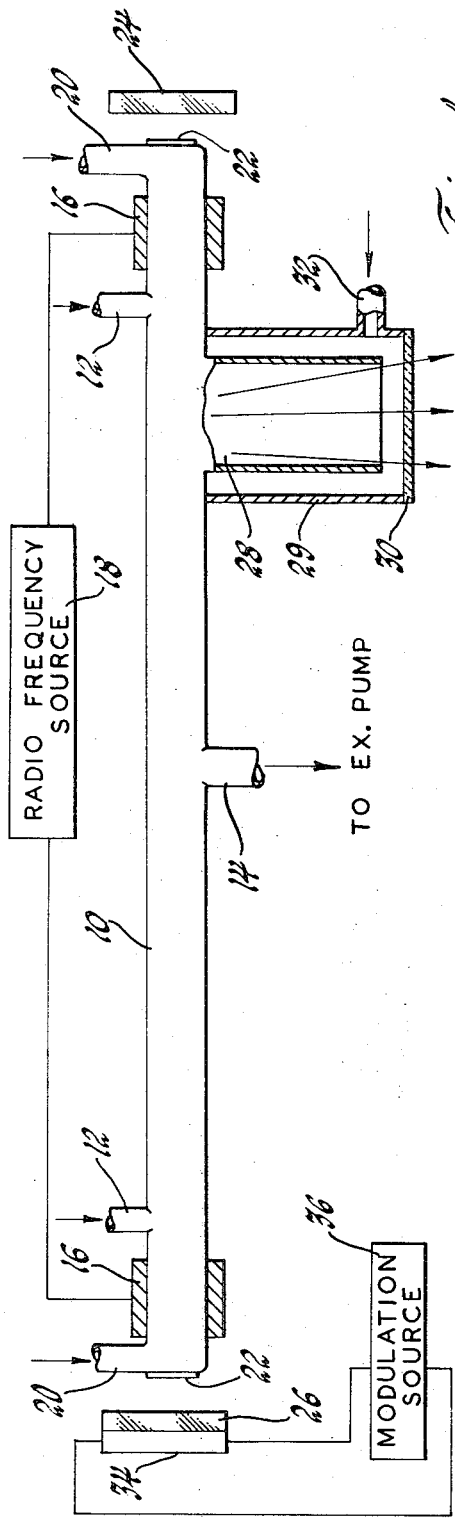
Figure 2:
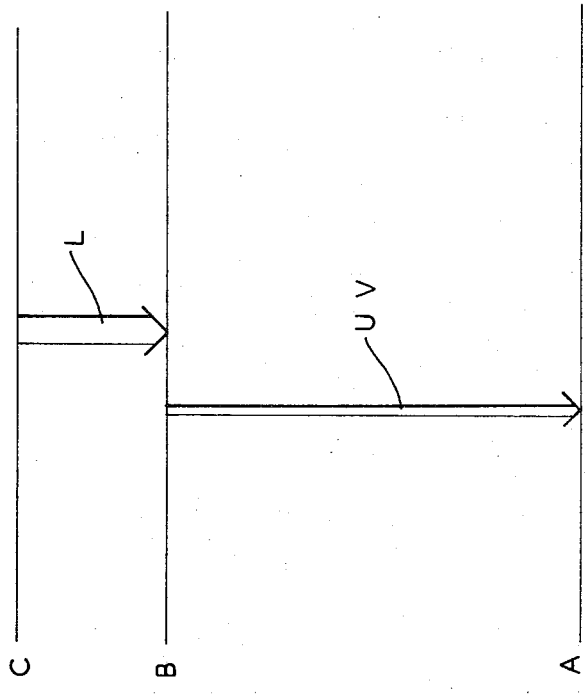

The above and other advantages will be made more apparent from the following specification taken in conjunction with the accompanying drawings wherein FIG. 1 is a schematic diagram of a radiation source according to the invention, and FIG. 2 is a diagram depicting the energy level transitions within the device of FIG. 1.

The radiation source as shown in FIG. 1 is essentially a gas laser modified to emit non-coherent secondary radiation rather than coherent light. The laser comprises a generally cylindrical tube or housing 10 for retaining the active gaseous medium. Ports 12, one near either end of the tube 10, admit the active gas into the tube from a source, not shown, and a centrally disposed exhaust port 14 allows flow of gases from the tube to an exhaust pump, not shown. A pair of annular electrodes 16 each place outboard of the ports 12 surround the ends of the tube 10. Each electrode is attached to one terminal of a radio frequency source 18. This arrangement provides pumping or excitation of the atoms of the active gas by the resulting radio frequency discharge through the tube 10. Further ports 20 at the extreme ends of the tube 10 are connected to a supply of inactive gas which serves to minimize loss of gain in the inactive end regions of the tube 10. End windows 22 in the extreme ends of the tube 10 allow passage of the coherent light whih is generated within the tube. A stationary mirror 24 and a second mirror 26 are disposed outside the windows 22 and are aligned to reflect the coherent light escaping from the tube 10 back into the tube. The mirrors are spaced at a multiple of half-wave lengths of the coherent light to form an optical resonator.

As thus far described the laser device of FIG. 1 is of conventional structure and the features described are well known in the art. In a conventional laser, however, one of the mirrors is only partially reflective so that a portion of the coherent light is transmitted through the mirror to form an output beam. In the present case, however, the emanation of coherent light is not required so that both mirrors preferably are fully reflective thereby increasing internal gain in the laser tube by minimizing mirror losses. This enhances the secondary radiation. A port or side window 28 is framed by a laterally extending tube 29 which is closed by a window 30 transparent to the secondary radiation escaping from the active medium. An inlet 32 in the side of the tube 29 admits an inactive gas to the port to facilitate the passage of the secondary radiation through the port. In the case of an atomic oxygen laser a suitable inactive gas to be admitted to port 32 as well as to the ports 20 is a mixture of argon, neon and/or helium. These gases are transparent to the secondary radiation and by keeping the oxygen away from the vicinity of the windows loss through absorption of radiation by oxygen is minimized. The window 30 is composed of $CaF_2$, $LiF$, or $MgF_2$ for an oxygen laser.

FIG. 2 depicts a simple energy level diagram for the atomic oxygen laser. Pumping the active laser medium excites the oxygen atoms from the ground state A to a high energy level C. The oxygen atoms then undergo a transition from energy level C to an intermediate energy level B emitting light at 8,446A. As is well known the transitions take place synchronously through the process of stimulated emission to produce coherent light designated by L in the diagram. Each atom then at energy level B quickly undergoes a transition to level A to emit the secondary ultra-violet radiation at 1,300A designated as UV in the diagram. Thus for each photon of coherent light there is a corresponding photon at a later time of ultra-violet light. However, since the ultra-violet photons have higher energy than the visible light photons the available ultra-violet radiation is greater, in terms of energy, than the coherent light.

There are several wel known techniques for modulating the coherent light in a laser by operating upon the laser itself. These same techniques may be used to achieve AM or FM modulation of the secondary radiation. One example is shown in FIG. 1 wherein the mirror 26 is mounted on a piezoelectric crystal 34 which is electrically connected to an electrical modulation source 36 which applies the desired frequency to the crystal 34. In this manner the mirror is vibrated at frequencies up to 100 megahertz. The vibrating mirror turns the oscillation of the laser on and off for the transition between energy levels C and B. When the laser action is on, the rate of population of the B level is increased over that which will normally arise from spontaneous emission from the level C to level B. Thus the secondary radiation escaping through the window 30 is amplitude modulated. In another example, not illustrated, an application of a modulating magnetic field across the active region of the laser will frequency modulate the secondary radiation.

To efficiently utilize the secondary radiation available within the laser cavity, the port 28 may be made co-extensive with the length of the active portion of the laser. On the other hand, when only a small port 28 is desired, the length of the laser cavity may be made correspondingly small.

It will be apparent that this invention is not limited to oxygen lasers. Rather depending on the characteristics of the radiation desired from the high intensity source, other types of lasers may be utilized according to the character of the secondary radiation available within the laser cavity.

The embodiment of the invention described herein is for purposes of illustration and the scope of the invention is intended to be limited only by the following claims.

It is claimed:

1. A high intensity radiation source comprising:
   an active laser medium,
   pumping means for exciting atoms in the medium to a first energy state to create a population inversion between said first energy state and a lower lying second energy state,
   optical resonator means comprising a pair of spaced fully reflecting reflectors disposed about said medium for causing a synchronous transition of atoms from said first energy state to said second energy state to produce coherent light, and for completely containing said coherent light within said fully reflecting resonator, whereupon secondary high intensity non-coherent radiation is produced upon the transition of the atoms between the second energy state to another lower energy state,
   and window means for passing said non-coherent radiation from the medium and resonator region.

2. A high intensity modulated radiation source comprising:
   an optical resonator comprising a pair of spaced fully reflective mirrors, the mirrors being nominally spaced at a multiple of half-wavelengths of a coherent light to be produced,
   a housing between the mirrors, end windows in the housing aligned with the mirrors,
   a gaseous active laser medium within the housing,
   pumping means for exciting atoms in the medium to a first energy state to create a population inversion between said first energy state and a lower lying second energy state,
   said optical resonator means being utilized to produce a synchronous transistion of atoms from the first energy state to a second energy state to produce coherent light within the resonator, and to completely contain said coherent light within said fully reflecting resonator, and secondary non-coherent radiation is produced upon the transistion of the atoms between the second energy state and another energy state,
   means for modulating the coherent light and hence modulating the secondary radiation,
   and a window in the housing to permit the escape of secondary radiation.

3. A high intensity modulated radiation source comprising:
   an optical resonator comprising a pair of spaced fully reflective mirrors, the mirrors being nominally spaced at a multiple of half-wavelengths of a coherent light to be produced,
   a housing between the mirrors, end windows in the housing aligned with the mirrors,
   a gaseous active laser medium within the housing,
   pumping means for exciting atoms in the medium to a first energy state to create a population inversion between said first energy state and a lower lying second energy state,
   said optical resonator means being utilized to produce a synchronous transistion of atoms from the first energy state to a second energy state to produce coherent light within the resonator, and to completely contain said coherent light within said fully reflecting resonator, and secondary non-coherent radiation is produced upon the transistion of the atoms between the second energy state and another energy state,
   means for axially oscillating one of the mirrors for modulating the coherent light and hence modulating the secondary radiation,
   and window means for passing said non-coherent radiation from the medium and resonator region.

4. A high intensity modulated ultraviolet radiation source comprising:
   an optical resonator comprising a pair of spaced fully reflective mirrors,
   a housing between the mirrors, end windows in the housing aligned with the mirrors,
   an atomic oxygen laser medium within the housing,
   electrical discharge means associated with the medium for exciting the laser medium to a high energy state whereupon a population inversion is produced between the high energy state and an intermediate energy state,
   said optical resonator being utilized to produce synchronous transition of atoms occurs from the high energy state to an intermediate energy state to produce coherent light within the resonator, whereupon secondary ultraviolet radiation is produced upon the transition of the atoms from the intermediate energy state to a low energy state,
   means for modulating the coherent light produced in the medium to accordingly modulate the ultraviolet radiation,
   a port in the housing for allowing escape of the modulated ultraviolet radiation therefrom,
   and means for excluding the laser medium from the vicinity of the port comprising means for maintaining a body of gas transparent to the ultraviolet radiation between the port and the laser medium.

* * * * *

PO-1050
(5/69)

UNITED STATES PATENT OFFICE
CERTIFICATE OF CORRECTION

Patent No. 3,801,926      Dated April 2, 1974

Inventor(s) Tom T. Kikuchi

It is certified that error appears in the above-identified patent and that said Letters Patent are hereby corrected as shown below:

Column 3, line 45, change "a" to read --the--,
          line 48, change "and" to read --whereupon--,
Column 4, line 15, change "a" to read --the--,
          line 18, change "and" to read --whereupon--,
          line 41, delete "occurs".

Signed and sealed this 3rd day of December 1974.

(SEAL)
Attest:

McCOY M. GIBSON JR.       C. MARSHALL DANN
Attesting Officer      Commissioner of Patents